(12) United States Patent
Schottland et al.

(10) Patent No.: US 10,662,349 B2
(45) Date of Patent: *May 26, 2020

(54) SHRINK WRAP LABEL COATING TO FACILITATE RECYCLING

(71) Applicant: SUN CHEMICAL CORPORATION, Parsippany, NJ (US)

(72) Inventors: Philippe Schottland, Sparta, NJ (US); Robert Mateuszczyk, Hopelawn, NJ (US); Saverio Lucci, Clinton, NJ (US); Yongping Zha, Berkeley Heights, NJ (US)

(73) Assignee: Sun Chemical Corporation, Parsippany, NJ (US)

( * ) Notice: Subject to any disclaimer, the term of this patent is extended or adjusted under 35 U.S.C. 154(b) by 148 days.

This patent is subject to a terminal disclaimer.

(21) Appl. No.: 15/922,474

(22) Filed: Mar. 15, 2018

(65) Prior Publication Data

US 2018/0215951 A1 Aug. 2, 2018

Related U.S. Application Data

(62) Division of application No. 14/911,534, filed as application No. PCT/US2014/048057 on Jul. 24, 2014, now Pat. No. 9,976,057.

(60) Provisional application No. 61/868,261, filed on Aug. 21, 2013.

(51) Int. Cl.
| | |
|---|---|
| *C09D 201/00* | (2006.01) |
| *C09D 175/04* | (2006.01) |
| *C09D 167/04* | (2006.01) |
| *C09D 101/08* | (2006.01) |
| *C09D 167/00* | (2006.01) |
| *C09D 129/04* | (2006.01) |
| *B08B 9/08* | (2006.01) |
| *B29B 17/02* | (2006.01) |
| *B29L 31/00* | (2006.01) |

(52) U.S. Cl.
CPC ............ *C09D 201/00* (2013.01); *B08B 9/083* (2013.01); *B29B 17/02* (2013.01); *C09D 101/08* (2013.01); *C09D 129/04* (2013.01); *C09D 167/00* (2013.01); *C09D 167/04* (2013.01); *C09D 175/04* (2013.01); *B29B 2017/0296* (2013.01); *B29L 2031/744* (2013.01); *Y02W 30/622* (2015.05)

(58) Field of Classification Search
USPC ..................................................... 428/195.1
See application file for complete search history.

(56) References Cited

U.S. PATENT DOCUMENTS

| | | | |
|---|---|---|---|
| 6,224,974 B1 | 5/2001 | Wuu | |
| 8,304,073 B2 | 11/2012 | Davies et al. | |
| 8,461,277 B2 | 6/2013 | Dougherty et al. | |
| 8,546,472 B2 | 10/2013 | Loos et al. | |
| 8,691,394 B2 | 4/2014 | Maruichi et al. | |
| 9,005,742 B2 | 4/2015 | Davies et al. | |
| 9,387,852 B2 | 7/2016 | Dorrnheim et al. | |
| 2005/0257882 A1 | 11/2005 | Dronzek | |
| 2012/0018098 A1 | 1/2012 | Henderson | |
| 2013/0145673 A1 | 6/2013 | Babcock, III | |
| 2014/0162077 A1 | 6/2014 | Maruichi et al. | |
| 2015/0191635 A1 | 7/2015 | Terfloth et al. | |
| 2015/0262514 A1 | 9/2015 | Kyogane et al. | |
| 2016/0194533 A1 | 7/2016 | Sakakibara et al. | |
| 2016/0200942 A1 | 7/2016 | Schottland et al. | |
| 2017/0213484 A1 | 7/2017 | Schottland et al. | |

FOREIGN PATENT DOCUMENTS

| | | |
|---|---|---|
| CN | 101085899 A | 12/2007 |
| CN | 101735437 B | 6/2010 |
| DE | 102006042074 | 2/2008 |
| EP | 2 162 360 A2 | 3/2010 |
| EP | 2162360 A2 | 3/2010 |
| EP | 2892044 A1 | 7/2015 |
| EP | 2956518 A1 | 12/2015 |
| JP | H11-512134 A | 10/1999 |
| JP | 2002-091316 A | 3/2002 |
| JP | 2005-28411 A | 10/2005 |
| JP | 2005 289411 A | 10/2005 |
| JP | 2006-293386 A | 10/2006 |
| JP | 2006 293386 A | 10/2006 |
| JP | 2006 308651 A | 11/2006 |
| JP | 2006-308651 A | 11/2006 |

(Continued)

OTHER PUBLICATIONS

Mexican Office Action with English summary thereof issued in counterpart Mexican Application No. MX/a/2016/002157 dated Mar. 28, 2019.
Office Action (with translation thereof) issued in Japanese Counterpart Application 2016-536098 dated Apr. 23, 2018.
Examination Report issued in European Counterpart Application 14 838 522.2 dated Apr. 16, 2018.
PCT International Preliminary Report on Patentability issued in related PCT/US2018/025668, dated Apr. 8, 2019.
International Search Report issued in International Application No. PCT/US2018/025668, dated Jul. 26, 2018.

(Continued)

*Primary Examiner* — Terressa Boykin
(74) *Attorney, Agent, or Firm* — Charles C. Achkar; Ostrolenk Faber LLP.

(57) ABSTRACT

The present invention discloses a method of enabling the easy separation of labels, including wrap around labels and sleeve labels, particularly shrink sleeve labels, from containers during recycling through the use of a specially formulated coating to be applied in the seam area. The coatings ensure proper bonding, and shrink properties, of the labels, and have been designed to help de-bonding of the seam in a hot caustic wash step, or a solvent wash step. The method does not rely on floatation separation and therefore may be applied to any container/label material combination regardless of their specific gravity differences.

44 Claims, No Drawings

(56) References Cited

FOREIGN PATENT DOCUMENTS

| JP | 2011-118102 A | 6/2011 |
|---|---|---|
| WO | WO 97/08261 | 6/1997 |
| WO | WO 2007/141115 A2 | 12/2007 |
| WO | WO 2012/161758 | 11/2012 |
| WO | WO-2014-034881 A1 | 3/2014 |
| WO | WO 2015/026479 A1 | 2/2015 |
| WO | WO2016037062 A2 | 3/2016 |
| WO | WO 2016/196267 A1 | 12/2016 |

OTHER PUBLICATIONS

Written Opinion of the International Searching Authority issued in International Application No. PCT/US2018/025668, dated Jul. 26, 2018.

Vylon.Amorphous co-polyester (solvent soluble type). Nov. 21, 2014 [online], [retrieved on May 13, 2018]. Retrieved from the internet. <URL:http://www.toyobo-global.com/seihin/xi/vylon_es/vylon_cg.pdf>;p. 1.

Chinese Office Action with English translation thereof issued in counterpart Chinese Application No. 201480046446.6 dated Feb. 3, 2019.

Chinese Office Action with English summary thereof issued in counterpart Chinese Application No. 201480046446.6 dated Jul. 29, 2019.

Office Action issued in Chinese Counterpart Application 201510977534.4 dated Jan. 17, 2018.

European Search Report issued in European Application No. 14838522.2, dated Jun. 26,2017.

Supplementary Partial European Search Report issued in European Application No. 14838522.2 dated Mar. 3, 2017.

Chinese Office Action issued in Chinese Application No. 201480046446.6 dated Mar. 1, 2017 (with English Translation).

Selke, Susan E. M. Culter, John D.. (2016). Plastics Packaging—Properties, Processing, Applications, and Regulations (3rd Edition)—3.11.2 Glass Transition Temperature. Hanser Publishers. Online version available at: http://app.knovel.com/hotlink/pdf/id:kt0113JA1/plastics-packaging-properties/glass-transition-temperature.

Communication pusuant to Article 94(3) EPC issued in counterpart European Application No. 14 838 522.2 dated Nov. 4, 2019.

Office Aciton issued in counterpart Mexican Application No. MX/a/2016/002157 dated Nov. 12, 2019 with English language summary thereof.

SHRINK WRAP LABEL COATING TO FACILITATE RECYCLING

CROSS REFERENCE TO RELATED APPLICATIONS

The present application is divisional application of co-pending U.S. application Ser. No. 14/911,534, filed Feb. 11, 2016, which is a § 371 National Phase application based on PCT/US2014/048057, filed Jul. 24, 2014, which claims the benefit of U.S. Provisional Application No. 61/868,261, filed Aug. 21, 2013. The subject matter of each of these applications is incorporated by reference in their entirety.

FIELD OF THE INVENTION

The present invention is in the field of materials and processes to enable the facile recycling of plastic containers. The present invention provides a coating to apply to labels, including wrap around and sleeve labels, particularly shrink wrap labels, for plastic containers to promote good bonding at the seam, with subsequent ease of recycling. The coatings of the invention are particularly useful for use on labels comprising polyethylene terephthalate (PET), glycol-modified PET (PET-G), polyolefins, cyclic polyolefins (COC) and alpha-polyolefins such as oriented polypropylene (OPP), oriented polystyrene (OPS) and polyethylene (PE), or polyvinyl chloride (PVC). Label substrates may be monolithic or multilayer and comprise one or more polymer layers typically produced via a co-extrusion process. The materials and processes of the invention enable good sealing, resistance to shrinking, and resistance to cold water, of the label applied to the container, while allowing efficient de-seaming and removal of the label during the recycling process.

BACKGROUND

Recycling of plastic containers has become increasingly more popular over the last several years. However, while the plastic containers are recyclable, the materials used to make the shrink wrap labels applied to the containers are often not recyclable. Therefore, it is necessary to remove the shrink wrap label from a plastic container, or separate the label material from the container material, to allow recycling of the plastic container. When the labels are not easily separable from the containers, many containers are not recycled that otherwise would be, and recycling yields are reduced. Thus, there is a need to produce easily separable labels to increase the efficiency of recycling.

The Association of Plastics Recyclers, guidelines from brand owners, and publications of the National Association for PET Container Resources (NAPCOR), are all pointing to the issue created by full body sleeve labels in the recycling system. The sleeves tend to obscure the automated detection systems during the sorting process. As a result, PET recycling facilities have seen decreasing yields as sleeved bottles tend to end up being separated from clear PET containers and discarded.

To alleviate the problems with sorting, recyclers and brand owners tend to recommend paper labels, or partial sleeves made with low density thermoplastic materials, such as polyolefins. However, such materials do not have the desirable shrink properties or printability of higher density substrates such as PET-G.

Moreover, there are currently certain restrictions when applying shrink wrap labels wherein the labels must be sealed at a seam to ensure a strong bond at the seam. For example, it is necessary to avoid printing in the margins of a shrink wrap structure prior to adhering or solvent-welding them together. In addition, it is necessary to clean or wipe the margins of the shrink wrap structure in the area to be seamed prior to adhering or solvent-welding them together.

Shrink sleeve separation from PET containers is typically achieved in the sink/floatation tanks as part of the overall PET recycling process, starting from bales of PET containers and ending with clear recycled PET (R-PET) flakes to be re-used for container making. Several film/resin suppliers, including Exxon, Toppas, and Cryovac, or converters such as Fujiseal, have introduced low density films or co-extruded film structures with low density (below 1.0 or at least below 1.05), to address the shrink sleeve separation issue. Such films are generally based on mono- or multi-layer structures including polymers built around a low density core, such as polyolefins, or micro-voided/cavitated polymer, optionally wrapped by a PET-G skin, and, if needed, a tie layer between the core and the PET-G. The overall density of the film is designed to make it floatable in the sink/floatation tank. However, if the density prior to printing is not low enough, it is possible for the printed sleeve to become too dense, and therefore unable to be separated from the standard PET to be recycled.

PET-G is the preferred material for shrink wrap labels. However, PET-G has a higher density (about 1.3), which hinders separation in the sink/floatation tanks. The density of PET-G may be reduced if voids are created in the extruded film. Incorporation of a blowing agent into a coating offers the advantage that the overall label structure can be significantly reduced in density after activation of the blowing agent by various means, and separated from the container by floatation in a suitable liquid. In principle, this will work both for an entire label, and a ground up mixture of label and container. A coating will show an advantage over an ink for two reasons. First, coating of the entire label means that the blowing agent will be evenly distributed over the label, so that no one area has a higher concentration of blowing agent. Conversely, when the blowing agent is incorporated into the ink printed only in selected areas, those areas will have a higher concentration of blowing agent. Because the blowing agent in a coating is more evenly distributed, it means that a smaller particle size and/or lower coat weight of blowing agent can be used, while still achieving the desired level of density reduction. This, in turn, means that a higher level of transparency, gloss, and slip can be maintained in the overall shrink label structure.

Second, a 100%, even, coating of an entire label will give a consistent level of density reduction between different label designs, compared to an ink which may be printed at a wide range of percentage coverages. This simplifies and standardizes the recycling process.

Additionally, a micro-voided or cavitated film is opaque white, while a foamable coating approach may provide transparency or translucency. Blowing agents that generate a gas on exposure to heat, pH change, photonic radiation and/or thermal energy may comprise any of the types that are well-known to those of skill in the art (see, for example, http://en.wikipedia.org/wiki/Blowing_agent and http://www.eiwa-chem.co.jp/en/product/types.html). Blowing agents may also include metal carbonates and bicarbonates, azides, azodicarbonamide, and diazonium salts.

In addition, it is well known to those of skill in the art that inks can bleed through from their desired location, either into an undesired location on a printed article, or even onto the body parts of someone holding that article (which may be aided by a body fluid such as sweat or saliva). An appropriate coating may alleviate the problem of bleeding.

A coating that is a gas barrier may also be advantageous. Gas barrier coatings are known in the art. However, there are no known coatings that are gas barriers combined with the ability to work as "de-seamable" coatings to improve recycling.

Thus, there is currently no practical or economical solution built around printable materials to address the shrink sleeve issue in the PET recycling process. Manufacturers either must use less-preferred substrates that are less dense than PET-G, or move to more complex, and likely more expensive, floatable film structures. Therefore, there is a need to provide a method to produce labels that have good bond strength at the seams, while still being easily separable from the plastic container during the recycling process.

SUMMARY OF THE INVENTION

The present invention provides novel coatings for labels, including wrap around and sleeve labels, particularly shrink wrap labels, for containers. As used herein, the terms "coating," "coatings," "coating of the invention," or "coatings of the invention" mean liquid compositions that can be deposited on a substrate in various ways, including, but not limited to, printing (such as, but not limited to, analog or digital, inkjet, offset, flexographic, lithographic, gravure, screen printing), roll coating, spray coating, die coating, use of a liquid dosing system such as needle or wick deposition currently done for in-line seaming of shrink sleeve film, and the like. Also provided are methods and processes for application and use of the coatings of the invention. The coatings of the invention promote good bonding at the seam, with subsequent ease of removal for recycling of the containers. The coatings of the invention are useful for coating labels, including wrap around and sleeve labels, particularly shrink wrap labels, to be applied to plastic containers. The coatings of the invention are particularly useful for use on labels comprising PET, PET-G, polyolefins, cyclic polyolefins (COC) and alpha-polyolefins such as OPP and polyethylene (PE), OPS or PVC. Coatings of the invention enable good sealing, resistance to shrinking, and resistance to cold water, of the label applied to the container, while allowing efficient de-seaming and removal of the label during the recycling process.

In one aspect, the present invention provides a method comprising applying a coating composition to a label substrate wherein:
 a) the label substrate is applied to a plastic article; and
 b) the coating enables removal of the sleeve label during recycling.

In one aspect, the present invention provides novel coating compositions to produce de-seamable labels wherein:
 a) the coating produces a bond strength of coating to substrate after seaming to the substrate, that is the greater 5 N/in or the tensile strength of the substrate;
 b) the coating produces a bond that is suitable for hot shrinking around a container or article; and
 c) the coating is delaminated when placed into a hot caustic environment.

In certain embodiments, the coating composition produces a bond strength of greater than 9 N/in of coating to substrate after seaming to substrate.

In another embodiment, the coating composition produces a bond strength of greater than 30 N/in of coating to substrate after seaming to substrate.

In one aspect, the present invention provides novel coating compositions as described above, comprising:
 a) at least one first resin with a Tg above about 25° C., and preferably above about 50° C.;
 b) at least one second resin hydrolysable or solutionable under the conditions of recycling; and
wherein the first and second resin may be the same or different.

In one embodiment, the coating forms a strong bond with the substrate via either a solvent or heat sealing process.

In one embodiment, the coating itself functions as a seaming material, so that no additional solvent or heat sealing process is necessary, and replaces the traditional seaming solvent.

In another embodiment, the coating compositions comprise at least one resin with a Tg above about 25° C., and preferably above 50° C., selected from the group consisting of polyesters, nitrocelluloses, acrylics, styrenics, shellacs, and polyurethanes.

In certain embodiments, the coating compositions further comprise at least one second resin which is at least partially solutioned or hydrolysed in an aqueous medium at a pH of 12 or greater.

In another embodiment, the second resin is selected from the group consisting of polyhydroxycarboxylic acids, sulfopolyesters, acrylics, polymers containing sulfonamide functionality, and polymers with a hydroxyl level of about 50 or greater.

In one embodiment, the acid value of the coating composition based on dry film is greater than 20.

In a certain aspect, the present invention provides a shrink sleeve label film substrate coated with the coating of the invention.

In one embodiment, the entire shrink sleeve label film substrate is coated with the coating.

In another embodiment, the substrate is partly coated with the coating composition.

In another embodiment, the coating has been applied to the substrate as a pattern to create a partial coverage in the seam area.

In certain embodiments, the shrink sleeve label substrate is coated in at least the seaming area with a coating of the invention.

In certain embodiments, the present invention provides a shrink sleeve label substrate coated in at least the seaming area with two outer layers of coatings of the invention, wherein the combination is a coating system that is at least partially hydrolysable or solutionable under the conditions of recycling, comprising:
 a) a first coating layer in contact with the sleeve film substrate comprising at least one resin with a Tg above 25° C., and preferably above about 50° C.; and
 b) a second coating layer applied over the first coating layer;

In one embodiment, the first coating layer is further in contact with the inks printed on the substrate.

In one embodiment, the second coating layer is further in contact with the inks printed on the substrate.

In another embodiment, both the first coating layer and the second coating layer are further in contact with the inks printed on the substrate.

In one embodiment, the two coating layers provide a coating system that is at least partially hydrolysable or solutionable under the conditions of recycling.

In a certain aspect, the present invention provides an article comprising a sleeve label as described above.

In one aspect, the present invention provides a novel method to produce sleeves for labeling plastic containers that can be removed from the container during a hot caustic wash step in the recycling process.

In another aspect, the present invention provides a novel method to produce sleeves for labeling plastic containers that can be removed from the container during a solvent wash step in the recycling process.

In one embodiment, the method to produce sleeves for labeling plastic containers that can be removed from the container during a hot caustic wash step or solvent wash step in the recycling process, comprises applying a coating of the invention to the sleeve label substrate.

In certain embodiments, the sleeves are removed by de-seaming from the container.

In one aspect, the present invention provides an article wrapped with a sleeve label applied as described above.

In one embodiment, the label separates from the article when the article is placed into a hot caustic wash.

In another embodiment, the label is comprised of a seamed substrate.

In another embodiment, the seamed substrate is a plastic substrate.

In certain embodiments, the label separates in less than 5 minutes at 65° C.

In another embodiment, the label separates in less than 3.5 minutes at 65° C.

In another embodiment, the label separates in less than 2 minutes at 75° C.

In another embodiment, the label separates in less than 1 minute at 85° C.

In certain embodiments, the sleeve label on which a coating of the invention has been applied can be de-seamed with a solvent. Suitable solvents include, but are not limited to, acetates, such as methyl acetate, ethyl acetate, and the like.

In one embodiment, the label is a full wrap label.

In another embodiment, the label is a partial wrap label.

In certain embodiments, the label is a shrink wrap label.

In certain embodiments, a coating composition that is not a hot melt glue or a water soluble adhesive composition is applied to the label.

In certain embodiments, the coating composition comprises the coating composition described above.

In one embodiment, the article is a plastic article.

In certain embodiments, the coatings of the invention can be adjusted to have a higher content of solids, to provide coatings suitable for seaming of in-line wrap around labels that are placed and seamed directly onto the containers. In some embodiments, the label film is coated in the target area with a coating of the invention, wrapped around a container, and heat-sealed onto the container. Labels so applied will de-seam from the containers when the containers are placed in a hot caustic bath. By seaming the labels directly onto the containers, an additional shrink step would not be necessary. Compared to containers affixed with a label seamed with hot melt glue, the containers of these embodiments would have higher heat resistance, which is an advantage for hot filling of containers. Compared to wrap around labeled containers seamed with water-based adhesives, the containers seamed according to these embodiments would have improved resistance to a water bath (such as when beverage containers are immersed in cold water for extended periods of time).

DETAILED DESCRIPTION OF THE INVENTION

The present invention provides novel coatings for labels, including wrap around and sleeve labels, particularly shrink wrap labels, for containers. The coatings of the invention promote good bonding at the seam, with subsequent ease of removal for recycling of the containers. The coatings of the invention are useful for coating labels, including wrap around and sleeve labels, particularly shrink wrap labels, to be applied to plastic containers. The coatings of the invention are particularly useful for use on labels comprising PET, PET-G, polyolefins, cyclic polyolefins (COC) and alpha-polyolefins such as OPP and polyethylene (PE), OPS or PVC. Coatings of the invention enable good sealing, resistance to shrinking, and resistance to cold water, of the label applied to the container, while allowing efficient de-seaming and removal of the label during the recycling process.

The present invention provides a way to easily separate sleeve labels from containers, such as PET bottles, during recycling, without adding special manual or mechanical removal equipment, and while maintaining sufficient bond properties within the sleeve to allow it to perform as a standard sleeve. Moreover, the coatings and methods of the present invention are not substrate limited. That is, the coatings and methods of the invention work with low or high density substrates such as polyolefins or PET-G. Additionally, the coatings of the invention may help protect the ink layers and minimize or eliminate the ink bleeding into the water/caustic used for recycling.

Another optional benefit of the invention is that, contrary to what is currently done to achieve good bonds, the sleeves may now be printed with graphics that include the seaming area. Using the methods currently used in the industry, precisely positioning the unprinted seam with regard to the graphics creates additional challenges for the label converters from printing through splitting and cutting. The coatings of this invention are designed to provide good bonds between the coating and the substrate (such as PET-G) even when there is printing in the seam.

The present invention relates to novel coating compositions for use with labels, including wrap around and sleeve labels, particularly shrink sleeve labels, that will allow for an easy separation of the label from the container during recycling, and, in particular, during the hot caustic wash step, or a solvent wash step. The method of separating the label from the container comprises applying a bondable, caustic de-seamable, coating layer of the invention in the seam area.

Although prior art teaches that sleeve labels must be printed such that the seam area remains free of ink or coating to ensure good solvent bondability, the coatings of the invention were developed to provide good bond strength for solvent seamed sleeves. In certain embodiments, the coatings of the invention were developed to themselves function as a seaming material, eliminating the need for the additional step of applying a separate seaming solvent, and replace the traditional seaming solvent, to form the seam of the sleeve label.

Good bonds are defined by the bond strength values measured by pulling perpendicularly to the seam direction and measuring the force necessary to separate the seam. Typical solvent bonds in shrink sleeve labels have a bond strength of 9.8 N/in to 34 N/in (see for example US 2008/0197540). The seamed samples are cut into 3/16 inch to 1-inch wide strips, and the ends are held by clamps. An Instron tensiometer is used to measure the force required to break the bond at a pulling speed of 15 cm/min. The results are expressed in N or N/in. In the present case, "good" bonds may be defined as bond strength values greater than 5 N/in, or preferably greater than 9 N/in, or more preferably greater than 30 N/in as measured at room temperature.

Suitable compositions of the invention form a coating layer onto the desired label substrate and provide good bond strength via a solvent or heat seaming process, or to function as a coating and seaming material in one step (without the need for an additional step of applying seaming solvent), replacing the traditional seaming solvent, to form a sleeve. Coatings of the invention withstand the heat shrinking process, whereby the labels are shrunk to fit snugly around the container, providing a seam with sufficient strength to hold the label around the container. During heat shrinking, heat may be applied through a steam tunnel, an IR tunnel, a convection tunnel, or by direct exposure to hot air. Typical temperature and residence time depends on the material, container shape, desired shrink rate, and the technique used to provide the heat. For example, a steam tunnel used for PET-G sleeves reaches between 70° C. and 95° C., with a residence time typically between 5 and 8 seconds, which is enough to achieve up to 75% shrink rate. There may also be a 15 second dip in 85° C. water post shrinkage for PET-G sleeves. Coatings of the invention are also resistant to cold water.

Coatings of the invention will de-seam when placed in hot caustic environments, such as those used during the whole container washing step that is part of the recycling process. The washing step is generally done at 85° C. to 90° C., with 2% to 3% NaOH.

In certain embodiments, coatings of the invention will de-seam when placed in a solvent wash.

The sleeves used to perform the seaming and forming tests were sized according to common practices for shrink labels in the industry. A typical sleeve for solvent seaming would be slit to provide a total length equal to the largest perimeter of the container plus 7 mm to account for the seaming area and overlap. A 7 mm margin typically provides a wide enough area for a good seam, but also a snug fit around the container at the largest perimeter in order to keep the sleeve in place during the hot shrinking process. Additional margin may be added to account for shrinkage due to thermal processes (such as the drying of the coating) which may induce some additional shrinkage. A larger sleeve may be used around a container to provide a desired effect such as a looser fit after shrinkage.

In one embodiment, the coatings of this invention comprise at least one resin with a Tg above about 25° C., preferably above about 50° C., more preferably above about 65° C., and most preferably above about 80° C., and one resin that is either hydrolysable or soluble in hot caustic solution. The first and second resin may or may not be the same. Hydrolysable or soluble resins include resins with an acid value greater than or equal to 4 (and preferably greater than or equal to 15, and more preferably greater than or equal to 25), resins with hydroxyl values greater than 5, and resins which will break down in hot caustic environments, such as polylactic acid. The coatings may be solvent based or water based, or use water/solvent mixtures, such as water/alcohol compositions. Examples of suitable resins, as identified in the examples, include certain polyesters, polyurethanes and also polyvinylalcohol and blends thereof.

In another embodiment, the de-seaming coatings are a blend of polyester resins comprising a resin with a Tg above about 25° C., preferably above about 50° C., more preferably above about 65° C., and most preferably above about 80° C., and a resin with a Tg below about 35° C. having high acid group functionalities. In yet another embodiment, the de-seaming coating further comprises a polymer which decomposes in hot caustic environments, such as polylactic acid.

De-seaming coatings are generally applied onto the reverse side of the sleeve label substrate (which may be pre-treated with an antistatic coating to prevent dust accumulation during printing and handling). Inks are also generally applied on the reverse side, except when the sleeve substrate is opaque, in which case the inks are surface printed. The coatings will be applied over at least a portion of the seaming area. They may be applied over the entire sleeve or have only a partial coverage. They may be applied as a uniform coating or in the form of a pattern of halftone designed to provide a suitable balance of seaming, shrinking and de-seaming properties. They may be allowed to overlap the inks. In one embodiment, the inks may be printed to the edge of the sleeve and be overprinted with the coating in the seaming area while still allowing suitable seaming, shrinking and de-seaming properties.

Coatings are preferably applied through a printing process, such as gravure or flexographic printing, but other deposition methods, such as roll, spray, die coating, dosing via needle or wicking, or screen printing may be possible by adjusting the coating composition to the rheology required for proper deposition for a particular technique.

Coating weight depends on the deposition technique used but will generally be in the range of 0.5 to 10 g/m$^2$ dry, more preferably between 1 and 6 g/m$^2$, and even more preferably between 1.5 and 4 g/m$^2$.

The coating compositions may optionally contain a colorant, such as a dye, a pigment, a taggant, or a fluorophore, to provide means to visualize the deposition or warn end users about the presence of a special de-seaming coating on the label.

In order to ensure good handling and easy fitting of the sleeves onto containers, the coatings will typically have a coefficient of friction at or below 0.3, preferably between 0.10 and 0.40, and more preferably between 0.15 and 0.35.

In order to achieve the desired printing, seaming, shrinking and de-seaming properties, one or more coating layers may be used. In one embodiment, a first coating layer which is hydrolysable, degradable or soluble in a hot caustic environment, is applied and overprinted with a second coating layer designed to ensure good seaming characteristics for sleeves. Alternatively, the coating layers may be reversed, wherein the first coating layer is designed to ensure good seaming characteristics for sleeves, and the second coating layer is hydrolysable, degradable or soluble in a hot caustic environment. After application of the two coating layers, the sleeve seam may be bonded via a solvent or heat sealing process; or the coating layers/system may additionally function as a seaming material, and replace the traditional seaming solvents.

As illustrated in the examples, the methods of this invention apply not only to PET-G sleeves, but also to other substrates, such as OPP, PVC, or OPS, either as monolithic substrates or multilayer structures, whether they are homogenous in composition or comprise layers of different compositions (such as PETG/OPS/PETG or PETG/OPP/PETG based structures or similar co-extruded structures further comprising tie-layers).

In one embodiment, the de-seaming coating comprises one or more renewable resins. Non-limiting examples of such resins include polylactic acid and/or a coating grade of recycled polyester such as JD2-25.

EXAMPLES

Tables 1 and 2 summarize the key properties and source for the materials used in Examples 1-5. Coating solutions were formulated by adding solvent to the resin, or to the resin varnish if the polymer was already supplied in solution form. For the tests, all samples were reduced to about 50 cps viscosity, as measured using a Brookfield spindle viscometer at approximately 20° C. Polyurethane resins, polyester resins, and nitrocellulose were viscosity adjusted by addition of ethyl acetate. Shellac resin and polyvinylalcohol (Aquaseal X2281) were viscosity adjusted by adding ethanol. The seams in Examples 1-5 were formed by either a traditional solvent or heat sealing process.

TABLE 1

Polyurethane resin materials used in this invention

| I.D | Solids | Viscosity | Solvents | Tg (° C.) | Acid Value mg KOH/g | Amine Value mg KOH/g | OH Value mg KOH/g | Mw Mn Pd | Building Blocks |
|---|---|---|---|---|---|---|---|---|---|
| 940-1071 | 32.0-35.0% | 300-600 cps | 1:1 (n-propanol:n-propyl acetate) | −36 & 41 | 0 | 3-8 | 0 | 24,000 13,200 1.8 | IPDI 1,4 BD pTHF EDA |
| 940-1133 | 49.0-51.0% | 550-900 cps | 1:1.25 (n-propanol:n-propyl acetate) | 60 | 34-41 | 0 | 0 | 8,600 4,075 2.10 | IPDI DMPA Dimer Diol MP Diol |
| 940-1205 | 52.0-54.0% | 250-450 cps | 30:70 (n-propanol:n-propyl acetate) | 49 | 3.6 | 0 | 277 | 1,986 1,131 1.76 | IPDI TMP 1,4 BD |
| 940-1151 | 33.0-36.0% | 900-1,300 cps | 1:1 (n-propanol:n-propyl acetate) | −22 & 81 | 2.6 | 5-12 | 0 | 24,761 15,194 1.63 | IPDI 1,4 BD pTHF EDA |
| 940-1033 | 29.5-33.0% | 300-800 cps | 1:1 (n-propanol:n-propyl acetate) | 8.5 & 41 | 0 | 3-8 | 0 | 32,400 16,300 2.01 | IPDI TDI 1,4BD pTHF EDA |

IPDI: isophorone diisocyanate
TDI: toluene diisocyanate
1,4-BD: 1,4-butanediol
DMPA: Dimethylol propionic acid
EDA: Ethylene diamine
TMP: Trimethylol propane
MP Diol: 2-methyl-1,3-propanediol

TABLE 2

Other polymers used in the examples

| Resins | Chemistry | Supplier | Tg (° C.) | Mn | OH Value mg KOH/g | Acid Value mg KOH/g | % Solids |
|---|---|---|---|---|---|---|---|
| Vyloecol BE-400 | Polylactic acid | Toyobo (JP) | 50 | 43,000 | 3 | — | 100 |
| 3-V-6 | Nitrocellulose varnish | — | — | — | — | — | 38.5 |
| Vylon 200 | Polyester | Toyobo (JP) | 47 | 17,000 | 5 | <2 | 100 |
| Vylon GK-360 | Polyester | Toyobo (JP) | 56 | 16,000 | 7 | 5 | 100 |
| Vylon GK-390 | Polyester | Toyobo (JP) | 17 | — | — | 30 | 100 |
| Vylon GK-800 | Polyester | Totobo (JP) | 50 | 18,000 | 7 | <2 | 100 |
| Aquaseal X2281 | PVOH aq. dispersion | Paramelt (Netherlands) | ~85 | — | — | — | 20 |
| Gantrez ES225 | Monoethyl ester of poly(methyl vinyl ether/ maleic acid) in ethanol | Ashland, Inc. (Covington, KY-USA) | — | — | — | 275-300 | 50 |
| Mowital B30H | Polyvinylbutyral | Kuraray Europe GmbH (Germany) | 68 | — | 18-21%[1] | — | 100 |

TABLE 2-continued

Other polymers used in the examples

| Resins | Chemistry | Supplier | Tg (° C.) | Mn | OH Value mg KOH/g | Acid Value mg KOH/g | % Solids |
|---|---|---|---|---|---|---|---|
| JD2-25 R-PET | Polyester | Sun Chemical (internal sample) | 31.2 | 6,150 | 100 | 36 | 100 |
| Tigerlac 5055 | Shellac resin | Kane Int. Corp (Rye, NY-USA) | — | — | 175-240 | 60-75 | 100 |

% hydroxyl expressed as the wt % of polyvinylalcohol in material

Coatings were applied to the reverse (print) side of the substrates with a #2 K Bar using a K-Coater (from RK Printcoat Instruments Ltd., Royston—United Kingdom) unless otherwise specified.

Films were then seamed with solvent so that the coated side faced the uncoated side (front side of the substrate). Suitable solvents include, but are not limited to, those sold for the purpose by Flexcraft Industries, Inc. of Newark, N.J., USA, such as Flexcraft 12-103 OB, a solvent blend comprising tetrahydrofuran (THF) as a major component. The seaming solvent composition may be optimized to provide the best seam strength given a specific substrate while meeting industrial application requirements in terms of evaporation speed, flash point, stability and toxicity. For seaming films composed of PET-G, solvent blends comprising THF are commonly used, but other solvents may be employed advantageously in conjunction with other shrink wrap substrates.

The solvent was applied using a solvent pen (felt tip) in combination with a manual seaming machine made by Ryback & Ryback (Monroe, N.C., USA). This formed a sleeve label which was then placed around a blank bottle and shrunk with the heat produced either by a hot air gun, via immersion in hot water (95° C.) bath, or by using a steam pot, for 5 to 10 seconds, depending on the technique. Sleeves were generally allowed to rest overnight in order to ensure that the solvent had fully evaporated before shrink tests.

For the above test, the PET bottle container used had an outer diameter of about 2.8 inches and a circumference of about 9 inches. The seam area on the sleeve label had a length of 6 inches and the sleeve was seamed to provide a snug fit around the bottle with a seamed sleeve perimeter of about 9.25" leaving about 7 mm for the seam area and ink overlap.

The labels were then checked after shrinking to see if the seam stayed intact (ie., passed the test) or came apart (failed). The seamed bottles that passed were then placed into plain hot water at 85° C. for 15 seconds to assess the sensitivity of the seal to potential overexposure in the steam tunnel.

Finally, the sleeved bottles that had passed all the other tests were placed into a water bath containing 2% aq. NaOH at 85° C. to simulate the recycling "bottle wash" conditions and timed to determine how long it would take for the seam to come apart.

Bond strength of the seamed area in the shrink direction was determined by making a solvent seam between the coated side of the film and the uncoated side using 1-inch wide samples. The ends of the print were then placed into an Instron Tensiometer (model number 3342 made by Instron in Norwood, Mass.—USA) and pulled in a direction perpendicular to the seam direction at a speed of 15 cm/min.

Example 1

Coatings based on different resin compositions and their blends were applied to a freshly corona treated shrink grade PET-G film substrate (Eastman Embrace film/50-micron thick) and tested for seaming performance. Samples that passed the seaming tests were then evaluated for shrink performance around a bottle container, and then, if applicable, de-seaming performance and hot non-caustic bath resistance test as described above. The solvent used for the seaming experiments was a custom mixture of Flexcraft 12-103 OB, a solvent blend available from Flexcraft Industries, Inc., and comprising 1,3-dioxolane, tetrahydrofuran, and xylenes, blended with additional tetrahydrofuran (in a ratio of 85:15). The results are shown in Table 3.

TABLE 3

Results of seaming, shrink and de-seaming experiments with various compositions

| Resin in Coating Sample | Label Substrate | Bond Strength (N/inch) | Seaming Solvent | Shrink test around container | De-seaming (hot caustic bath) | Hot Water Bath resistance test |
|---|---|---|---|---|---|---|
| 940-1133 | PET-G | 5 | 85% 12-103OB:15% THF | Seam Separated | — | — |
| 940-1205 | PET-G | 5 | 85% 12-103OB:15% THF | Seam Separated | — | — |
| Tigerlac 5055 | PET-G | 0.5 | 85% 12-103OB:15% THF | Seam Separated | — | — |
| JD2-25 R-PET | PET-G | 7 | 85% 12-103OB:15% THF | Seam Separated | — | — |

TABLE 3-continued

Results of seaming, shrink and de-seaming experiments with various compositions

| Resin in Coating Sample | Label Substrate | Bond Strength (N/inch) | Seaming Solvent | Shrink test around container | De-seaming (hot caustic bath) | Hot Water Bath resistance test |
|---|---|---|---|---|---|---|
| Vyloecol BE400 | PET-G | 5 | 85% 12-103OB:15% THF | Seam Separated | — | — |
| Vylon 880 | PET-G | 12 | 85% 12-103OB:15% THF | Seam Separated | — | — |
| Vylon 390 | PET-G | 8 | 85% 12-103OB:15% THF | Seam Separated | — | — |
| Vylon 360 | PET-G | 6 | 85% 12-103OB:15% THF | Seam Separated | — | — |
| 940-1133/940-1205 (1:1 blend) | PET-G | 6 | 85% 12-103OB:15% THF | Seam Separated | — | — |
| 3-V-6 (NC) | PET-G | 7 | 85% 12-103OB:15% THF | Seam Separated | — | — |
| 940-1133/3-V-6 (1:1 blend) | PET-G | 8 | 85% 12-103OB:15% THF | Seam Separated | — | — |
| JD2-25/Vyloecol BE400 | PET-G | 10 | 85% 12-103OB:15% THF | Seam Separated | — | — |
| JD2-25/940-1133 (1:1 blend) | PET-G | 49 | 85% 12-103OB:15% THF | Seam Intact | Deseamed <10 secs | Seam Intact |
| 940-1133/JD-225 (1:1 blend) | PET-G | 42 | 85% 12-103OB:15% THF | Seam Separated | N/A | N/A |
| Vylon 360/Vylon 390 (blend 1:1) | PET-G | 50 | 85% 12-103OB:15% THF | Seam Intact | Deseamed <10 secs | Seam Intact |
| Vylon 390/Vylon 880 (1:1 blend) | PET-G | 48 | 85% 12-103OB:15% THF | Seam Intact | Deseamed <10 secs | Seam Intact |
| Mowitol B30H | PET-G | 6 | 85% 12-103OB:15% THF | Seam Separated | N/A | N/A |
| 940-1071 | PET-G | 9 | 85% 12-103OB:15% THF | Seam Separated | N/A | N/A |
| 940-1151 | PET-G | 7 | 85% 12-103OB:15% THF | Seam Separated | N/A | N/A |
| Gantrez ES-225 | PET-G | 4 | 85% 12-103OB:15% THF | Seam Separated | N/A | N/A |
| Aquaseal X2281 | PET-G | 45 | 85% 12-103OB:15% THF | Seam Intact | Deseamed <10 secs | Seam Intact |

Note:
Bond strengths were measured with Instron Tensiometer model 3342 using 1 inch-wide (2.54 cm) samples and a speed of 15 cm/min.

12-103OB is THF-based solvent blend made by Flexcraft Industries, Inc. (Newark, N.J.—USA) which is commonly used for seaming PET-G sleeves.

For the selected combination of film substrate and seaming solvents, only a few coating compositions provided seams with the desirable combination of properties, which include high Instron bond strength values, and remained intact after the shrink test, but also delaminated in a hot caustic bath. Polyester coating compositions appeared to provide the best performance in the test, either alone, or as a blend with a polyurethane resin. In particular, the blend of a higher Tg polymer (polyester, acrylic, styrenic, nitrocellulosic or polyurethane), and lower Tg polyester with a higher acid value seemed the most effective for solvent-based coating compositions. The improved performance of polyester blends compared with single resins is not completely unexpected as combinations of high and low Tg polymers usually provide better film formation and general coating properties.

Additional examples not reported in Table 3, wherein polylactic acid (VyloEcol BE-400 from Toyobo JP) was added as a minor component up to 20 wt % to polyester compositions, providing good bond strength such as 1:1 mixtures of Vylon 360 and 390 or Vylon 390 and 880, also resulted in compositions having the desired properties for the de-seamable coatings. The introduction of additional material hydrolysable under the conditions of recycling, usually comprising treatment with an aqueous medium of pH 12 or greater, such as polylactic acid, appeared to help accelerate de-seaming in the hot caustic bath, and also reduce the coefficient of friction from about 0.30 (static) and 0.26 (kinetic) to 0.21 (static) and 0.19 (kinetic). Other polyhydroxycarboxylic acids, such as polymers derived from caprolactone, are also of benefit, as are polymers with a hydroxyl value of 50 or greater, such as polyvinyl alcohols, starches and cellulosics, sulfopolyesters, acrylics, and polymers containing sulfonamide functionality. Note that a coefficient of friction (CoF) of 0.3 or less is desirable for shrink sleeves to provide suitable performance on shrink labeling production equipment. The CoF was measured with an instrument from Testing Machines, Inc., of New Castle, Del. 19720, USA, model number 32-06-02, equipped with a 200 gram weight and of weight dimensions: 2½ in by 2⅕ in, at a speed setting of 6. The results in Table 3 also show that the water based polyvinyl alcohol composition tested (which comprised at print viscosity 11 wt % solids, 46 wt % water and 43 wt % alcohol), and which was applied with a #2 K-bar, provided suitable properties for the de-seaming coatings.

In summary, example 1 shows that de-seaming coatings may be formulated as either solvent-based or water-based compositions, and emphasizes the need to have at least one resin with a Tg of over 50° C., and a hydrolysable or high acid value resin.

Example 2

Additional experiments were carried out with different substrates (PET-G, OPP and PVC) using pure Flexcraft 12-103 OB as the seaming solvent. Interestingly, some compositions, such as a polyurethane system, provided better performance on OPP and PVC than on PET-G. Also, the water-based coating made from polyvinylalcohol, which exhibited excellent results on PET-G, did not perform well on OPP and PVC. The results are shown in Table 4.

TABLE 4

Results of seaming, shrink and de-seaming experiments with various compositions

| Substrate | Coating | Bond Strength (N/inch) | Seaming Solvent | Shrink Test | Hot Water Bath | De-seaming (hot caustic) |
|---|---|---|---|---|---|---|
| OPP | 940-1133 | 41 | 12-103 OB | Seam Intact | Seam Intact | <30 seconds |
| PVC | 940-1133 | 50 | 12-103 OB | Seam Intact | Seam Intact | <30 seconds |
| PVC | Vylon 360/Vylon 390 | 39 | 12-103 OB | Seam Intact | Seam Intact | <30 seconds |
| PET-G | 940-1133 | 1 | 12-103 OB | Poor Seam/separated | N/A | N/A |
| OPP | Aquaseal | 1.4 | 12-103 OB | Seam separated | N/A | N/A |
| PVC | Aquaseal | 10 | 12-103 OB | Seam separated | N/A | N/A |
| PVC | Aquaseal | 1 | 12-103 OB | Seam separated | N/A | N/A |
| PET-G | Aquaseal | 50 | 12-103 OB | Seam Intact | Seam Intact | <30 seconds |
| PET-G | None (control) | 50 | 12-103 OB | Seam Intact | Seam Intact | >10 minutes |

These results show that the de-seamable coating concept can be applied to other shrink label substrates besides PET-G, such as OPP and PVC, with the proper selection of resin systems for adhesion as well as seaming characteristics. Any structure based on these materials either as monolayers or multilayers, homogenous or heterogenous, may be a candidate to create de-seamable sleeves via selection of an optimized coating composition to be applied at least in the seaming area.

Example 3

A coating based on a combination of polyester resin (Vylon 360/Vylon 390) at a ratio of 9:1 was tested for performance on printed and unprinted PET-G shrink sleeves. The coating, adjusted to a viscosity of about 50 cps, was applied with a #2 K-bar. Seaming was performed with Flexcraft 12-103 OB solvent. On both substrates, the coating provided acceptable seaming and shrinking performance, and was able to de-seam in less than 4 minutes when placed in a hot caustic bath.

Similar experiments were performed with a combination of polyester resin (Vylon 360/Vylon 880) at a ratio of 1:1 applied with a #2 K-bar on top of printed and unprinted PET-G sleeves. Seaming was performed with Flexcraft 12-103 OB solvent. On both substrates, the coating provided acceptable seaming and shrinking performance and was able to de-seam in less than 4 minutes when placed in a hot caustic bath.

Example 4

PET-G shrink label film samples, some of which were printed with inks, were coated with a first hydrolysable coating comprising a primary resin with a Tg above 50° C. A second coating, selected for its solvent seaming characteristics to the substrate (such as a polyester), was applied on top of the first coating. The combination of the two coatings produced good solvent seaming characteristics and fast de-seaming in the hot caustic bath during the recycling wash step.

Example 5

Using a structure similar to example 4, a first hydrolysable coating was applied onto the substrate followed by a second coating selected for its heat sealing properties. The sleeve was then formed using a heat sealing process to form the seam (solventless process) and then shrunk around the container/article. The combination of the two coatings produced good heat seaming characteristics and fast de-seaming in a hot caustic bath during the recycling wash step.

Examples 6-8

Inventive coatings were made wherein the coating additionally functioned as a seaming material, replacing traditional seaming solvents, and eliminating the need for an additional step of solvent or heat sealing. The coatings of Examples 6-8 provided strong bonds, and were easily de-seamable during a hot caustic wash step. Table 4 lists material characteristics of representative components used in Examples 6-8. Table 5 shows non-limiting examples of coating solutions which would replace the traditional seaming solvent.

In general, test methods followed standard ASTM procedures wherever possible. Because of the small size of some of the samples, or equipment limitations, however, some minor modifications to the ASTM procedures were required.

The solids content of the coating solutions was determined by weight difference before, and after evaporating solvent by heating a 10 g sample at 150° C. for 30 min.

Viscosity was measured by a Brookfield DV-E viscometer with spindle LV-1(61) at 60 rpm, and approximately 20° C. The viscosity of the coating solutions were adjusted to about 25 to about 50 cps.

"T-peel" bond strength of the seam was measured along the direction of seaming using Instron Model 3342 single column universal testing system, with a load of 50 N and crosshead speed of 300 mm/min, following ASTM Method D1876. The average peeling load at average value (integral) was determined from the autographic curve between the first and last peaks. The "T-peel" bond strength is the average peeling load in gram-force per in (or Newton per inch) of the seam width required to separate the adhered sleeves.

Break strength of the seam in the shrink direction, (perpendicular to seaming) was measured by the same general method as "T-peel" bond strength. Break strength is the maximum peeling load in gram-force per inch (or Newton per inch) of the seam width, and is the load required to separate the adhered sleeves.

Shrink test was performed by immersing a blank bottle wrapped with a seamed shrink sleeve into a Ryback and Ryback S3 steam machine for 5-10 seconds, depending on the technique. It is considered a pass if the sleeve shrinks snuggly around the bottle and the seam stays intact coming out from the steam pot.

De-seaming was measured by immersing the sleeved bottle into a water bath containing a caustic solution at a temperature which is aimed at simulating the conditions of a full bottle (pre) wash process used in typical wet grinding PET recycling. Unless specified otherwise, the conditions of the bath were 1 wt % NaOH at 65° C. The de-seaming time was the time measured between the immersion of the bottle into the caustic until the sleeve label fully separated from the bottle.

TABLE 4

Components used in Examples 6-8

| | Mn (×10$^3$) | Mw (×10$^3$) | Tg (° C.) | Ring & Ball Softening Point (° C.) | Acid Value (KOH mg/g) | Hydroxyl Value (KOH mg/g) |
|---|---|---|---|---|---|---|
| Vylon GK880 | 18 | N/A | 84 | N/A | <4 | 5 |
| SMA 2625 | 3.6 | 9.0 | 110 | N/A | 220 | N/A |
| r-PET JD-2-25 | 1.4 | 6.2 | 31 | N/A | 36 | 100 |
| Foralyn 90 | N/A | N/A | N/A | 82 | 8 | N/A |

Vylon GK880 is amorphous copolyester (Tyobo)
S2625 is partially esterified styrene maleic anhydride copolymer (Cray Valley)
r-PET JD-2-25is a proprietary recycled PET (Sun Chemical)
Foralyn 90 is an ester of hydrogenated rosin (Eastman Chemical)

Examples 6-8 were used to form a continuous, adhesively bonded seam at the overlapped longitudinal edge portions of PET-G shrink sleeves. Seaming was performed by a Stanford AccraSeam™ shrink sleeve seamer. The line speed was 300 m/min. The DSS volume set point was 36 ml/min for Examples 6 and 7, and 20 ml/min for Example 8. The width of the seam was about 3-3.5 mm. All tests on seamed shrink sleeves were taken at least 3 hours after seaming. The properties of Examples 6-8, and shrink sleeves seamed by them, are summarized in Table 6.

TABLE 5

Coating solutions

| | Example 6 | Example 7 | Example 8 |
|---|---|---|---|
| Vylon GK880 | 18 | 16.5 | 18 |
| SMA 2625 | 3 | 4.5 | 3 |
| r-PET JD-2-25 | 3 | 3 | 3 |
| Foralyn 90 | 3 | 3 | 3 |
| SAIB-90EA | | 1 | 1 |
| EtOAc | 42 | 41 | 20 |
| MeOAc | 21 | 21 | |
| THF | 10 | | 5 |
| 1,3-dioxolane | | 10 | |
| Acetone | | | 47 |
| Total | 100 | 100 | 100 |

SAIB-90EA is a plasticizer solution comprising 90% sucrose acetate isobutyrate and 10% ethyl acetate (Eastman Chemical)

TABLE 6

Testing of Examples 6-8 coating solutions:

| | Example 6 | Example 7 | Example 8 |
|---|---|---|---|
| Solids content (%) | 29 | 31 | 22 |
| Viscosity (cP) | 32 | 30 | 25 |
| Acid number of the solution (KOH mg/g) | 9 | 12 | 9 |
| Acid number of the solids (KOH mg/g) | 32 | 44 | 32 |
| T-peel strength of seam | 271 gf/in (2.7 N/in) | 262 gf/in (2.6 N/in) | 152 gf/in (1.5 N/in) |
| Break strength of seam | 21.6 kgf/in (212 N/in) | 19.2 kgf/in (188 N/in) | 18.3 kgf/in (179 N/in) |
| Shrink test | Pass | Pass | Pass |
| De-seaming time at 65° C. (min:seconds) | 6:25 | 3:56 | 7:50 |
| De-seaming time at 75° C. (min:seconds) | 1:57 | 0:35 | 0:49 |

Examples 6-8 show that coatings of the invention can replace traditional seaming solvents, providing good bond strength, while being easily de-seamable during the recycling process.

Example 9 (Comparative Example)

A comparative example was made wherein a commercial seaming solvent, 12-103 (Flexcraft), was used in place of a coating solution of the invention to seam the shrink sleeves (i.e. seaming done in the traditional manner as found in the prior art). The seaming procedures and measurement conditions were the same as for Examples 6-8. Table 7 shows the test results.

TABLE 7

Testing of Comparative Example 9

| | Comparative Example 9 |
|---|---|
| Solids content (%) | 0 |
| Viscosity (cP) | 1 |
| Acid number of the solution (KOH mg/g) | 0 |
| Acid number of the solids (KOH mg/g) | 0 |
| T-peel strength of seam | 821 gf/in (8 N/in) |
| Break strength of seam | 23.7 kgf/in (232 N/in) |
| Shrink test | Pass |
| De-seaming time at 65° C.) (min:seconds) | Cannot de-seam within 60 min |
| De-seaming time at 75° C. (min:second) | Cannot de-seam within 60 min |

Table 7 shows that although traditional solvent seaming provides good bond strength, the shrink sleeve wraps so produced are not easily de-seamed. Therefore, the coatings of the invention are superior in that they not only provide good bond strength, but also produce sleeves that are easily de-seamable in the hot caustic wash step of the recycling process, allowing for more efficient recycling of PET bottles.

Examples 10-12

The coatings of Examples 10-12 were applied to PET-G sleeves that were subsequently heat-seamed. The coatings of Examples 10 and 11 provided strong bonds, and were easily de-seamed during a hot caustic wash step. Table 8 lists the compositions of Examples 10-12.

TABLE 8

Compositions of Examples of 10-12

|  | Example 10 | Example 11 | Example 12 |
|---|---|---|---|
| Vylon GK880 |  |  | 9 |
| Vylon GK800 |  |  | 9 |
| Vylon 200 |  | 10.5 |  |
| SMA 2625 |  |  | 3 |
| r-PET JD-2-25 | 27 | 16.5 | 3 |
| Foralyn 90 |  |  | 3 |
| SAIB-90EA | 1 |  |  |
| EtOAc | 10 | 41.5 |  |
| MeOAc | 62 | 31.5 | 63 |
| 1,3-Dioxolane |  |  | 10 |
| Total | 100 | 100 | 100 |

The coatings of Examples 10-12 were applied onto freshly corona-treated shrink grade PET-G film substrates with a #2 K-bar. After fully drying, the coated films were heat seamed using a Uline Impulse Sealer H-190, with a heat setting of 3.5 for 1.5 seconds. Break strength of the seams were measured on 1 inch seamed strips cut from the film by Theller Mini Tensile Tester Model D. The procedures for the shrink and de-seaming tests were the same as described in Examples 6-9. Table 9 shows the test results.

TABLE 9

Properties of coatings of Examples 10-12, and corresponding shrink sleeves

|  | Example 10 | Example 11 | Example 12 |
|---|---|---|---|
| Solids content (%) | 28 | 27 | 27 |
| Dry coat weight (gsm) | 2.2 | 3.0 | 1.8 |
| Acid number of the solution (KOH mg/g) | 10 | 6 | 8 |
| Acid number of the solids (KOH mg/g) | 36 | 22 | 31 |
| Break strength of seam | 3.3 kgf/in (33 N/in) | 8.3 kgf/in (82 N/in) | 2.2 kgf/in (22 N/in) |
| Shrink test | Pass | Pass | Pass |
| De-seaming time at 65° C. (min:seconds) | <2 min | 3:30 min | >25 min |

Examples 10-11 show that coatings of the invention can be used in heat seam applications, providing good bond strength, while being easily de-seamable during the recycling process. Example 11 is particularly suitable as de-seamable coating due to the presence of a higher Tg resin in the composition.

Example 13 (Comparative Example)

A comparative example was made wherein an uncoated PET-G film substrate (Eastman Embrace film/50 microns thick) was heat-seamed, and tested using the same procedures as described for Examples 10-12. The results are shown in Table 10.

TABLE 10

Testing of Comparative Example 13

|  | Example 13 |
|---|---|
| Break strength of seam | 3.0 kgf/in (29 N/in) |
| Shrink test | Pass |
| De-seaming time at 65° C. (min:seconds) | Cannot de-seam within 60 min |

Table 10 shows that the uncoated PET-G shrink film was unable to de-seam in the hot caustic condition, although its seam strength was comparable to Examples 10-11. Therefore the coatings of the invention are superior in that they not only provide good bond strength, but also produce heat-seamed sleeves that are easily de-seamable in the hot caustic wash step of the recycling process, allowing for more efficient recycling of PET bottles.

Example 14

The coatings of Examples 6-8 can be adjusted to have a higher content of solids. The adjusted coatings can be applied to in-line wrap around labels that are placed and seamed directly onto the containers. The characteristics of the coatings, and the labels seamed with the coatings, can be tested as described above.

Example 15

The coating of Example 11 can be applied to the target seam area of a label film, and the label wrapped around a container and heat-sealed. The characteristics of the coatings, and the labels seamed with the coatings, can be tested as described above.

The present invention has now been described in detail, including preferred embodiments. However, it will be appreciated that those skilled in the art, upon consideration of the present disclosure, may make modifications and/or improvements that fall within the scope and spirit of the invention.

We claim:

1. A method comprising applying a coating composition to a label substrate, wherein:
   a) the label substrate is applied to an article;
   b) the coating enables removal of the label during recycling; and
   c) the coating composition comprises:
      i) a first resin having a Tg above about 25° C.;
      ii) a second resin having a Tg above about 50° C.; and
   the coating composition is at least partially hydrolysable in a hot caustic solution.

2. The method of claim 1, wherein said coating composition or at least one of the resins is at least partially solutionable in a hot caustic solution.

3. The method of claim 1, wherein each of the resins in the coating composition is at least partially hydrolysable in a hot caustic solution.

4. The method of claim 1, wherein one resin has an acid value equal or greater than 25.

5. A method comprising applying a coating composition to a label substrate, wherein:
a) the label substrate is applied to an article;
b) the coating enables removal of the label during recycling; and
c) the coating composition comprises:
i) a first resin having a Tg above about 25° C.;
ii) a second resin having a Tg above about 50° C.; and
the coating composition is at least partially hydrolysable in a hot caustic solution.

6. The method of claim 5, wherein said coating composition or at least one of the resins is at least partially solutionable in a hot caustic solution.

7. The method of claim 5, wherein one resin has an acid value equal or greater than 25.

8. The method of claim 5, wherein each of the resins is at least partially hydrolysable in a hot caustic solution.

9. A seamed label comprising:
a label including a seam comprised of a coating composition that comprises:
i) a first resin having a Tg above about 25° C.; and
ii) a second resin having a Tg above about 50° C.;
wherein the coating composition is at least partially hydrolysable in a hot caustic solution.

10. The seamed label of claim 9, wherein the seamed label is configured into a sleeve.

11. The seamed label of claim 9, wherein the coating composition produces a seam bond strength that is the greater of 5 N/in or the tensile strength of a substrate comprising the label.

12. The seamed label of claim 9, wherein the coating composition produces a seam bond strength that is 9 N/in or greater.

13. The seamed label of claim 9, wherein the coating composition produces a seam bond strength that is 30 N/in or greater.

14. The seamed label of claim 9, wherein deseaming of the seamed label occurs in an aqueous 1 wt % NaOH solution at 65° C. in about 1 to 10 minutes, preferably 1 to 8 minutes, more preferably about 1 to 5 minutes, even more preferably about 1 to 4 minutes.

15. A seamed label comprising:
a label including a seam comprised of a coating composition that comprises:
i) a first resin having a Tg above about 25° C.; and
ii) a second resin having a Tg above about 50° C.;
wherein at least one of the resins is at least partially hydrolysable in a hot caustic solution.

16. The seamed label of claim 15, wherein the seamed label is configured into a sleeve.

17. The seamed label of claim 15, wherein the coating composition produces a seam bond strength that is the greater of 5 N/in or the tensile strength of a substrate comprising the label.

18. The seamed label of claim 15, wherein the coating composition produces a seam bond strength that is 9 N/in or greater.

19. The seamed label of claim 15, wherein the coating composition produces a seam bond strength that is 30 N/in or greater.

20. The seamed label of claim 15, wherein deseaming of the seamed label occurs in an aqueous 1 wt % NaOH solution at 65° C. in about 1 to 10 minutes, preferably 1 to 8 minutes, more preferably about 1 to 5 minutes, even more preferably about 1 to 4 minutes.

21. A labeled article comprising:
an article;
a label secured to the article with a coating composition comprising:
i) a first resin having a Tg above about 25° C.; and
ii) a second resin having a Tg above about 50° C.;
wherein the coating composition is at least partially hydrolysable in a hot caustic solution.

22. The labeled article of claim 21, wherein the label is configured into a sleeve held intact by the coating composition.

23. The labeled article of claim 21, wherein the label is configured into a sleeve held intact by the coating composition in a seam area of the label.

24. The labeled article of claim 21, wherein the label is comprised of a shrinkable material shrunk to conform to the article.

25. The labeled article of claim 23, wherein the label is comprised of a shrinkable material shrunk to conform to the article.

26. The labeled article of claim 21, wherein the article is a container.

27. The labeled article of claim 21, wherein the article is a recyclable container.

28. The labeled article of claim 21, wherein label is removed from the article in an aqueous 1 wt % NaOH solution at 65° C. in about 1 to 10 minutes, preferably 1 to 8 minutes, more preferably about 1 to 5 minutes, even more preferably about 1 to 4 minutes.

29. A labeled article comprising:
an article;
a label secured to the article with a coating composition comprising:
i) a first resin having a Tg above about 25° C.; and
ii) a second resin having a Tg above about 50° C.;
wherein at least one of the resins is at least partially hydrolysable in a hot caustic solution.

30. The labeled article of claim 29, wherein the label is configured into a sleeve held intact by the coating composition.

31. The labeled article of claim 29, wherein the label is configured into a sleeve held intact by the coating composition in a seam area of the label.

32. The labeled article of claim 29, wherein the label is comprised of a shrinkable material shrunk to conform to the article.

33. The labeled article of claim 31, wherein the label is comprised of a shrinkable material shrunk to conform to the article.

34. The labeled article of claim 29, wherein the article is a container.

35. The labeled article of claim 29, wherein the article is a recyclable container.

36. The labeled article of claim 29, wherein label is removed from the article in an aqueous 1 wt % NaOH solution at 65° C. in about 1 to 10 minutes, preferably 1 to 8 minutes, more preferably about 1 to 5 minutes, even more preferably about 1 to 4 minutes.

37. A method of separating a label from a labeled article comprising the steps of:
placing the labeled article of claim 21 into a hot caustic solution; and
detaching the label from the article, wherein the detaching occurs upon exposure of the coating composition to the hot caustic solution for a sufficient time interval.

38. The method of claim 37, wherein the hot caustic solution is an aqueous 1 wt % NaOH solution at 65° C. and the sufficient time interval is about 1 to 10 minutes, preferably 1 to 8 minutes, more preferably about 1 to 5 minutes, even more preferably about 1 to 4 minutes.

39. A method of separating a label from a labeled article comprising the steps of:
placing the labeled article of claim 29 into a hot caustic solution; and
detaching the label from the article, wherein the detaching occurs upon exposure of the coating composition to the hot caustic solution for a sufficient time interval.

40. The method of claim 39, wherein the hot caustic solution is an aqueous 1 wt % NaOH solution at 65° C. and the sufficient time interval is about 1 to 10 minutes, preferably 1 to 8 minutes, more preferably about 1 to 5 minutes, even more preferably about 1 to 4 minutes.

41. A method of recycling a labeled article comprising the steps of:
placing the labeled article of claim 21 into a hot caustic solution; and
detaching the label from the article, wherein the detaching occurs upon exposure of the coating composition to the hot caustic solution for a sufficient time interval; and
recycling the article.

42. The method of claim 41, wherein the hot caustic solution is an aqueous 1 wt % NaOH solution at 65° C. and the sufficient time interval is about 1 to 10 minutes, preferably 1 to 8 minutes, more preferably about 1 to 5 minutes, even more preferably about 1 to 4 minutes.

43. A method of recycling a labeled article comprising the steps of:
placing the labeled article of claim 29 into a hot caustic solution; and
detaching the label from the article, wherein the detaching occurs upon exposure of the coating composition to the hot caustic solution for a sufficient time interval; and
recycling the article.

44. The method of claim 43, wherein the hot caustic solution is an aqueous 1 wt % NaOH solution at 65° C. and the sufficient time interval is about 1 to 10 minutes, preferably 1 to 8 minutes, more preferably about 1 to 5 minutes, even more preferably about 1 to 4 minutes.

* * * * *